ns Patent [19]

Rahmede et al.

[11] Patent Number: 4,695,181
[45] Date of Patent: Sep. 22, 1987

[54] BALL JOINT

[75] Inventors: Karl-Heinz Rahmede, Düsseldorf; Horst-Heinz Stemmer, Meerbusch, both of Fed. Rep. of Germany

[73] Assignee: TRW Ehrenreich GmbH & Co. KG, Fed. Rep. of Germany

[21] Appl. No.: 900,386

[22] Filed: Aug. 26, 1986

[30] Foreign Application Priority Data

Aug. 28, 1985 [DE] Fed. Rep. of Germany ....... 3530633

[51] Int. Cl.[4] .............................................. F16C 11/00
[52] U.S. Cl. ..................................... 403/135; 403/133
[58] Field of Search ................ 403/140, 135, 133, 132

[56] References Cited

U.S. PATENT DOCUMENTS

| 3,329,454 | 7/1967 | Melton et al. ............... 403/135 X |
| 3,545,797 | 12/1970 | Korecky ....................... 403/140 X |
| 3,554,586 | 1/1971 | Cutler . |
| 3,650,552 | 3/1972 | Schmid . |
| 3,787,127 | 1/1974 | Cutler ........................... 403/140 X |
| 4,297,047 | 10/1981 | Farrant . |
| 4,353,660 | 10/1982 | Parks ................................ 403/132 |

FOREIGN PATENT DOCUMENTS

| 928438 | 5/1956 | Fed. Rep. of Germany . |
| 1292953 | 4/1969 | Fed. Rep. of Germany . |
| 1953116 | 5/1971 | Fed. Rep. of Germany . |
| 2337147 | 2/1974 | Fed. Rep. of Germany . |
| 2365720 | 5/1978 | France ............................ 403/140 |
| 1398106 | 6/1975 | United Kingdom ............. 403/132 |
| 2052619 | 1/1981 | United Kingdom ............. 403/133 |

Primary Examiner—Andrew V. Kundrat
Attorney, Agent, or Firm—Tarolli, Sundheim & Covell

[57] ABSTRACT

A ball joint including a ball stud and housing having a chamber. The ball stud has a ball end portion disposed in the chamber. A resiliently deformable bearing member is disposed between the housing and ball end portion. The housing has a plurality of elevations formed therein. The elevations have radial extending side surfaces defining recesses. The elevations engage and deform portions of the bearing member into the recesses upon preloading the bearing member.

12 Claims, 8 Drawing Figures

BALL JOINT

BACKGROUND OF THE INVENTION

1. Field of the Invention

The invention relates to an automotive ball joint having an elastomeric bearing disposed between a ball head portion of a ball stud and a joint housing. Particularly, the invention relates to the manner in which the bearing is preloaded by the joint housing.

2. Background Art

U.S. Pat. No. 3,650,552 discloses a ball joint having an elastomeric bearing disposed between a joint housing and a ball head portion of a ball stud. The bearing includes two parts, which are disposed at axial opposite ends of the joint housing. An end surface of one of the bearing parts has concentrically arranged rings with a plurality of spring elements formed therein which extend axially away from the bearing part to engage an inner end surface of the joint housing. The spring elements are resiliently deformed during assembly of the ball joint to preload the bearing. Preloading the bearing compensates for production tolerances of the joint parts and wear of the bearing to prevent free play. The resilience of the bearing also permits the absorption of shock. To achieve these results in the known ball joint, the bearing must be of a relatively large volume so that it behaves rigidly in operation, and is provided with the spring elements to axially preload the bearing. Also, the bearing is only loosely engaged on its side surface by the joint housing. The spring elements abuttingly engage the inner surface of the joint housing. Therefore, only a slight amount of relative rotational movement can be transmitted without the bearing moving relative to the joint housing.

German published application No. 1,953,116 discloses a ball joint having a bearing of a hard plastic firmly clamped into the joint housing on one side and which is pressed by small elevations on its end against a shoulder surface of the joint housing. The elevations are deformed plastically in assembling the ball joint and assure a compensation of production tolerances and a relatively uniform contact of the bearing against a ball head. This ball joint is not suitable for absorbing shock. Rather, a shock load leads to further plastic deformation of the elevations, which tends to adversely affect the opertion of the ball joint. To prevent the bearing from rotating in the joint housing, a relatively expensive clamping construction is provided.

German Pat. No. 928,438 discloses a ball joint with an inner bearing which is preloaded against sharp projections arranged in ring form on the inside of the housing cover. In tightening the housing cover to adjust the bearing play, the projections are flattened. Alternating loads of the ball joint lead to the plastic deformation of the projections and cause an increase cf free play in the bearing. Moveover, the bearing is not secured against rotation in the joint housing, so that the operational characteristics of the ball joint vary and increased wear is expected.

It is, therefore, an object of this invention to provide a ball joint having a compact bearing which is prevented from rotation relative to the joint housing, is preloaded to compensate for production tolerances and wear, and absorbs shock loads.

SUMMARY OF THE INVENTION

The present invention provides a ball joint having a joint housing with raised portions, or elevations, on an inner bottom of the joint housing. Recesses are arranged between the elevations. The elevations form rigid support and contact surfaces for an elastomeric bearing. The elevations support portions of the bearing to preload the bearing and deform the bearing into the recesses.

In a ball joint, designed in accordance with the present invention, the bearing is supported by the elevations, and the bearing can be elastically deformed into the recesses between the elevations. The deformability of the bearing is limited by contact with surfaces of the recesses in the inner bottom in the joint housing. Production tolerances of the bearing, ball head and joint housing can thus be compensated for through the resiliency of the bearing. The surfaces of the recesses prevent deformation of the bearing to the point of overstressing.

The critical amount of preloading of the bearing and its contact on the ball head are thus determined by the resiliency of the bearing and the shape of the inner bottom of the joint housing, so that some degree of relative rotation of the ball stud and joint housing is permitted. The resilient forces of the preloaded bearing prevent, in operation, bearing free play caused by wear. Shocks occurring in operation are absorbed elastically insofar as the resilient properties of the bearing material, the dimensions and arrangement of the elevations in the inner bottom of the joint housing permit. The bearing is prevented from rotation relative to the joint housing because the bearing has deformed portions extending into the recesses in the inner bottom of the joint housing and which engage the sides by the elevations. All these advantages are attained with a simply shaped bearing, of compact construction, and of which the wall thickness varies only slightly.

In one embodiment of the invention, it is provided that the elevations extend from a flat surface in the inner bottom of the joint housing. The flat surface is simple to produce. The bearing can also be centered against the flat surface.

In another embodiment, an inner bevel is provided extending from the inner bottom of the joint housing, which contributes to the prevention of relative rotation.

In another embodiment, the elevations project out from an inner spherical surface of the joint housing which allow very large bearing deformation zones.

In another embodiment, the bearing is designed in two parts. One bearing part can be optimized as to resiliency, and the other bearing part as to sliding properties.

In another embodiment, the elevations run radial outwardly relative to the longitudinal axis of the ball stud. The elevations are arranged symmetrically in the bottom of the joint housing allowing a very uniform support of the bearing. It is especially advantageous if the elevations or ridges increase in width as the radial distance of the elevations from the axis increases. For intentional influencing of the elastic deformation of the bearing shell, symmetrically arranged cams may be provided in the bottom of the joint housing.

BRIEF DESCRIPTION OF THE DRAWINGS

Further features of the present invention will become apparent to those skilled in the art to which the present invention relates from a reading of the following specification made with reference to the accompanying drawings, in which.

DESCRIPTION OF A PREFERRED EMBODIMENT

Figure 1:
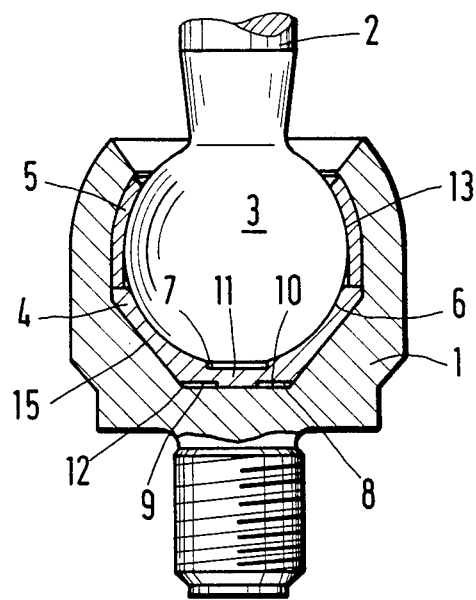
FIG. 1 is a cross-sectional side view of a ball joint of the present invention.

The ball joint of the present invention includes a joint housing 1 and a ball stud 2 having a ball head 3 and a shank portion extending therefrom with a longitudinal central axis. The ball head 3 is disposed in a chamber of the joint housing. An inner semi-spherical bearing 4 and an outer semi-spherical bearing 5 are disposed between the ball head 3 and joint housing 1. The outer surface 6 of the inner bearing 4 has a grease reservoir 7.

An end portion 8 of the inner bearing 4 rests on the inner bottom 9 of the joint housing 1 and is supported by the support surfaces of the elongated elevations 10, or raised portions, of the inner bottom 9. The inner bearing 4 is centered by a portion 11 projecting into the center 12 of the inner bottom 9 of the joint housing 1. The elevations 10 in the inner bottom 9 of the joint housing, project inwardly from a flat surface. The elevations 10 have radial extending side surfaces 14 which define recesses 12.

During assembly, the bearings 4, 5 are preloaded by deforming a shoulder portion of the joint housing 1 disposed adjacent an opening into engagement with the bearing 5. The bearing 5 is in engagement with the bearing 4 and transmits forces thereto. The inner bearing 4 has portions which are resiliently deformed near its end 8, into recesses 12 of the inner bottom 9. The elevations 10 and the recesses 12 are so arranged and dimensioned that the resiliency of the inner bearing 4 compensates for production tolerances of the ball head 3, the bearings 4, 5 and the joint housing 1. Wear of the bearings 4, 5 is also compensated for by the resiliency of the bearings. Also, by a proper choice of the bearing material and the proper shaping of the inner bottom 9, it is possible for operating shock loads to be absorbed by an additional deformation of the inner bearing 4. In case of an overload, the deformed portions of the bearing 4 contact the walls of the recesses 12 which form rigid contact surfaces to limit the amount of deformation.

A certain minimum deformation of the inner bearing 4, near the inner bottom 9, is desirable so that bearing free play occurring in operation due to wear in the ball running surfaces 6, 13 of the bearing 4, 5 is compensated for by resilient forces of the preloaded inner bearing 4. Also, the bearing 4 has portions which are deformed when preloaded, and project into the recesses 12 of the inner bottom 9. These projecting portions engage the side surfaces 4 of the ridges 9 to prevent rotation of the inner bearing 4 relative the joint housing 1.

The inner bearing 4 engages the inner bevel 15 of the joint housing 1 which also aids in preventing relative rotation therebetween.

Figure 2:
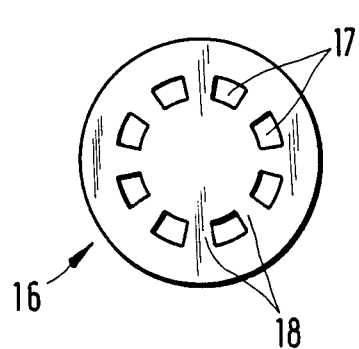
FIG. 2 is an enlarged top view illustrating one configuration of the inner bottom of the joint housing.
Figure 3:
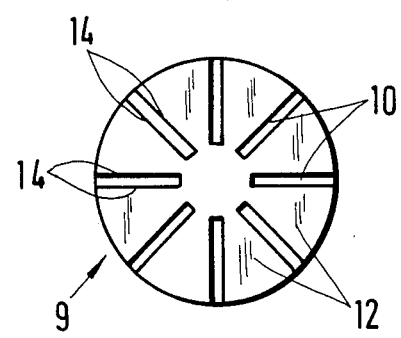
FIG. 3 is an enlarged top view illustrating the inner bottom of the joint housing of FIG. 1.
Figure 4:
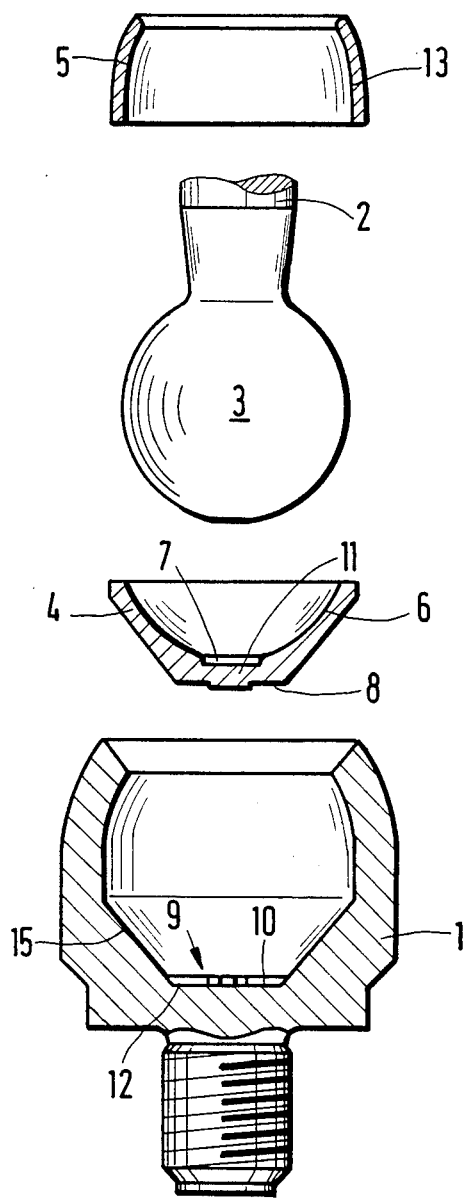
FIG. 4 is an exploded view of the ball joint of FIG. 1.

Many embodiments of the inner bottom of the joint housing are possible. FIG. 2 illustrates the inner bottom 16 having cams 17, which project from a flat surface. The cams 17 interact with the recesses 18 and influence the properties of the ball jont, as described above.

Figure 5:
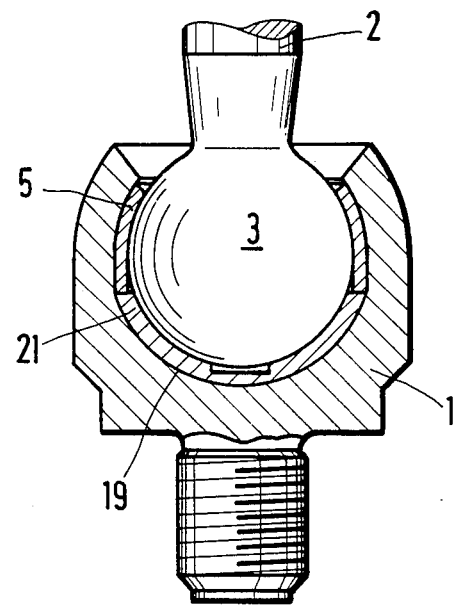
FIG. 5 is a cross-sectional side view of another embodiment of the ball joint having a joint housing with a spherical inner surface portion.
Figure 7:
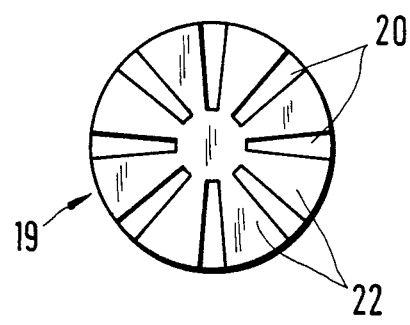
FIG. 7 is an enlarged top view illustrating the inner bottom of the joint housing of FIG. 5.
Figure 8:
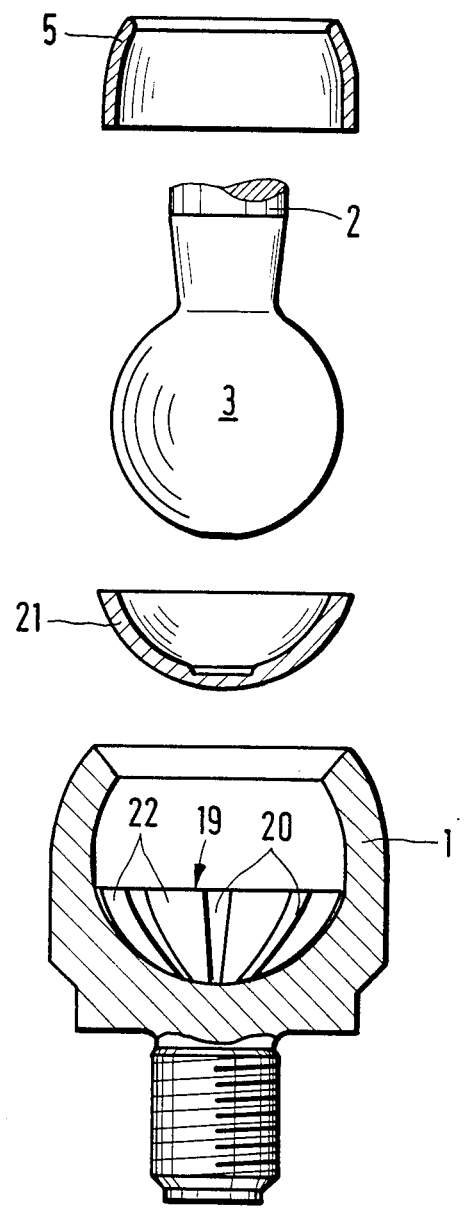
FIG. 8 is an exploded view of the ball joint of FIG. 5

FIGS. 5, 7 and 8 illustrate the inner bottom 19 of the joint housing 1 having elevations 20 which project from a semispherical surface portion of the inner bottom. Since the inner bottom 19 surrounds the exterior surface of the inner bearing 21, the bearing can be deformed to a more extensive degree. A resilient ball joint is thereby provided having improved relative rotation prevention characteristics.

When deformed, the inner bearing 21 has portions which are supported by elevations 20 extending meridianally. The inner bearing 21 is deformed into the recesses 22 on the inner bottom 19. The elevations 20 may be constructed to have an increasing width as the elevations extend radially outward as viewed in FIG. 7.

Figure 6:
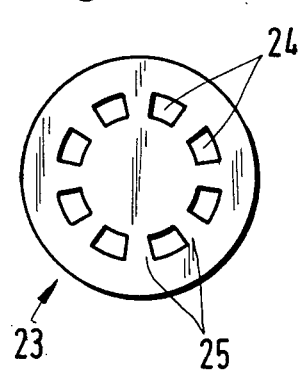
FIG. 6 is an enlarged top view illustrating one configuration of the inner bottom of the joint housing.

As FIG. 6 shows, the inner bottom 23 may be provided with cams 24, which project from a semispherical surface which cooperates with the recesses 25 to influence the properties of the ball joint similar to that described above.

As described above, a ball joint according to the invention is simple in construction, economical to produce and can bear rugged operating conditions for a long time.

Having described a preferred embodiment, the following is claimed:

1. A ball joint comprising:
   a housing having a surface defining a chamber;
   a ball stud having a shank portion extending outwardly from said housing and a ball end portion disposed in said chamber; and
   a resiliently deformable bearing member disposed between said housing and said ball end portion;
   said housing having a plurality of elevations thereon, each of said elevations having radially extending side surfaces defining a plurality of recesses therebetween, and said resiliently deformable bearing member being preloaded and having portions deformed into said recesses to limit rotation of the bearing member relative to the housing.

2. A ball joint as set forth in claim 1 wherein said housing has an opening, through which said shank portion extends said surface defining a chamber having a flat surface portion disposed opposite the opening, and said elevations extend from said flat surface portion.

3. A ball joint as set forth in claim 1 wherein said housing has an opening, through which said shank portion extends said surface defining a chamber having a semispherical surface portion disposed opposite the opening, and said elevations extend from said semispherical surface portion.

4. A ball joint as set forth in claim 1 wherein said resiliently deformable bearing member includes two separate bearing parts.

5. A ball joint as set forth in claim 1 wherein said elevations are elongated and are disposed in a radial array relative to the longitudinal axis of said ball stud.

6. A ball joint as set forth in claim 1 wherein said elevations are cams.

7. A ball joint as set forth in claim 1 wherein said housing has an opening through which said shank portion extends, said elevations being arranged opposite said opening, and said housing having a portion located adjacent said opening and which is deformed to preload said bearing member against said elevations and deform said bearing member into said recesses.

8. A ball joint as set forth in claim 7 wherein said elevations each have a contact surface area against which said bearing member is preloaded in response to deformation of said housing portion.

9. A ball joint comprising:
a housing having a surface defining a chamber;
a ball stud having a shank portion extending outwardly from said housing and a ball end portion disposed in said
a resiliently deformable bearing member disposed between said housing and said ball end portion;
said hosuing having a plurality of elevations therein each of said elevations having radially extending side surfaces defining recesses between the elevations, said resiliently deformable bearing member being preloaded and having portions deformed into said recesses;
said housing having an opening through which said shank portion extends;
said surface defining a chamber having a flat surface portion disposed opposite said opening, said elevations extending from said flat surface portion;
said surface defining a chamber further including a sloping surface portion which extends radially outward from said flat surface portion and towards said opening.

10. A ball joint comprising:
a housing having a chamber;
a ball stud having a shank portion extending outwardly from said housing and a ball end portion disposed in said chamber; and
a resiliently deformable bearing member disposed between said housing and said ball end portion;
said housing having a plurality of elevations therein each of said elevations having radially extending side surfaces defining recesses between the elvations, said resiliently deformable bearing member being preloaded and having portions deformed into said recesses;
said elevations being elongated and disposed in a radial array relative to the longitudinal axis of said ball stud;
each of said elevations increasing in width as each elevation extends in a direction away from the longitudinal axis of said ball stud.

11. A ball joint comprising:
a housing having a surface defining a chamber;
a ball stud having a shank portion extending outwardly from said housing and a ball end portion disposed in said chamber; and
a resiliently deformable bearing member disposed between said housing and said ball end portion;
said housing having a plurality of elevations therein each of said elevations having radially extending side surfaces defining recesses between the elevations, said resiliently deformable bearing member being preloaded and having portions deformed into said recesses, said elevations providing rigid support surfaces for said resiliently deformable bearing member and limiting deformation of said resiliently deformable bearing member;
said surface defining a chamber having a flat surface portion and said elevation extending from said flat surface portion;
said surface defining a chamber further including a surface portion which extends radially outward from said flat surface portion at an angle thereto.

12. A ball joint comprising:
a housing having a chamber;
a ball stud having a shank portion extending outwardly from said housing and a ball end portion disposed in said chamber; and
a resiliently deformable bearing member disposed between said housing and said ball end portion;
said housing having a plurality of elevations therein each of said elevations having radially extending side surfaces defining recesses between the elevations, said resiliently deformable bearing member being preloaded and having portions deformed into said recesses, said elevations and said recesses providing rigid support surfaces for and limiting deformation of said resiliently deformable bearing member;
said elevations being disposed in a radial array relative to the longitudinal axis of said ball stud, and being formed as ribs arranged symmetrically on the bottom of said housing and increasing in width as each rib extends radially away from said longitudinal axis.

* * * * *

UNITED STATES PATENT AND TRADEMARK OFFICE
CERTIFICATE OF CORRECTION

PATENT NO. : 4,695,181
DATED : September 22, 1987
INVENTOR(S) : Karl-Heinz Rahmede, Horst-Heinz Stemmer It is certified that error appears in the above-identified patent and that said Letters Patent are hereby corrected as shown below:

Column 5, line 14, after "said" insert --chamber; and--.

Column 5, line 17, change "hosuing" to --housing--

Column 5, line 42, change "elvations" to --elevations--

Signed and Sealed this

Twenty-sixth Day of January, 1988

Attest:

DONALD J. QUIGG

*Attesting Officer*                *Commissioner of Patents and Trademarks*